United States Patent
Chiu

[19]

[11] Patent Number: 6,054,787
[45] Date of Patent: Apr. 25, 2000

[54] ELECTRIC MOTOR

[75] Inventor: Andrew Shun Pui Chiu, Kowloon, The Hong Kong Special Administrative Region of the People's Republic of China

[73] Assignee: Ngai Keung Metal & Plastic Manufactory Ltd, The Hong Kong Special Administrative Region of the People's Republic of China

[21] Appl. No.: 09/289,652

[22] Filed: Apr. 12, 1999

[51] Int. Cl.⁷ .............................. H02K 15/16; H02K 7/04
[52] U.S. Cl. .............................. 310/51; 310/261; 310/183
[58] Field of Search .................... 310/51, 67 R, 310/179, 195, 197, 210, 261, 183, 140, 141, 142

[56] References Cited

U.S. PATENT DOCUMENTS

| | | | |
|---|---|---|---|
| 626,172 | 5/1899 | Lamme | 310/183 |
| 2,831,133 | 5/1958 | Hansen et al. | 310/183 |
| 3,256,454 | 6/1966 | Redwood | 310/183 |

FOREIGN PATENT DOCUMENTS

| | | | |
|---|---|---|---|
| 484953 | 5/1992 | European Pat. Off. | H02K 15/16 |
| 3235773 | 3/1984 | Germany | H02K 23/22 |
| 55-103065 | 8/1980 | Japan | H02K 19/14 |
| 55-111508 | 2/1982 | Japan | H02K 15/16 |
| 60-200750 | 10/1985 | Japan | H02K 15/16 |
| 2-206345 | 8/1990 | Japan | H02K 15/16 |
| 7-322542 | 12/1995 | Japan | H02K 3/20 |
| 2251131 | 6/1992 | United Kingdom | H02K 15/16 |

*Primary Examiner*—Thomas M. Dougherty
*Assistant Examiner*—Burton S. Mullins
*Attorney, Agent, or Firm*—Burns, Doane, Swecker & Mathis, L.L.P.

[57] ABSTRACT

The present invention provides an electric motor with a reduced number of windings on one of the coil windings. The effect of this is that when the motor is in operation, the current that flows through the coil with the reduced number of windings differs from the others, and this difference can be detected to allow accurate control of the motor. To avoid any mechanical imbalance caused by this difference in the number of windings, mechanical compensation means is provided on the arm with the reduced number of windings. Preferably this comprise a further winding that is not electrically connected to the motor circuit.

6 Claims, 4 Drawing Sheets

ELECTRIC MOTOR

FIELD OF THE INVENTION

This invention relates to an electric motor, and in particular to an electric motor of the type having one winding that differs from the other windings.

BACKGROUND OF THE INVENTION AND PRIOR ART

DC motors are widely used in many industrial and consumer applications. In many cases absolute precision in movement is not an issue, but precise speed control often is. An example of this would be the drive motor of a cassette player. The cassette player is expected to run at a constant speed and so speed control is important, but the motor does not have to run for precise increments which are fractions of a turn, or to stop at a certain point.

However, some motor applications do require precise positioning. For example, the motors used in high resolution plotters, disk drives, and robotics must all be carefully and precisely controlled in terms of position. There are also a number of applications that require both precise speed control and some position accuracy. Video recorders, compact disc drives and high quality cassette recorders are example of this type of device. Furthermore, by controlling DC motors accurately they can overlap with many of the applications of stepper motors.

The cost of the control system depends on the accuracy of the feedback and the speed of the processor. There are two general types of motor control systems: open loop systems and closed loop systems. In an open loop system the controller outputs a signal to turn the motor on and off or to change the direction of rotation of the motor. Closed loop systems are similar to open loop systems but in addition involve a feedback signal to the controller from the motor which feedback signal carries information about the speed, and/or position and/or the direction of motion of the motor. An example of a closed loop system is one where the motor must run at a constant speed (eg a cassette recorder) where the controller constantly adjusts the speed of the motor to keep it within limits and uses a feedback signal from the motor to do this.

The feedback signal may come from a sensing device adapted to sense motion. Examples of possible sensing devices include optical encoders, infrared detectors, Hall effect sensors and many others. Depending on the application, one or more of such sensors may be chosen. However, they all have their own disadvantages. Optical sensors, for example, often have to be provided with some form of housing or encapsulation to prevent a loss of sensitivity from ambient light, dust and dirt and so on. For Hall effect sensors, in practice the gap between a magnet that is mounted on the motor rotor and the sensing device is often too large for accurate and reliable results.

A traditional electric motor comprises an armature bearing three windings. The armature rotates in a magnetic field and current is generated in the three windings and drawn from them in turn through brushes.

Such a conventional motor is shown in FIG. 1A. A motor armature comprises a rotor having three equiangularly spaced poles 1 about each of which is wound a coil winding $\Phi$. Coil windings $\Phi$ are connected to commutator segments 2 which in turn are contacted by brushes (not shown). Such a motor may be used to cause rotation by applying current to the windings which then rotate within a magnetic field, or may be used in reverse to generate current from rotation of the windings within the magnetic field.

In a conventional motor the three coil windings $\Phi 1$, $\Phi 2$ and $\Phi 3$ are all identical and have identical numbers of turns in each winding. When the motor rotates, the current that flows through each winding is therefore identical. One way of providing a feedback control signal is to form the three coil windings $\Phi$ with a differing numbers of turns. This is shown in FIG. 1B where winding $\Phi 1$-1 is formed with a reduced number of turns in comparison with windings $\Phi 2$ and $\Phi 3$. The effect of this is that as the motor rotates the current that flows through winding $\Phi 1$-1 is different from that which flows through windings $\Phi 2$ and $\Phi 3$. This difference can be detected and used to count the number of rotations of the motor, and also to mark and define the beginning of rotation cycles of the motor. This information can be used in a number of ways to accurately control the rotation of the motor in a number of applications as discussed above. Furthermore this feedback control system has the advantage of not requiring an additional sensor, instead the information of the actual motor speed and the position of the motor can be extracted from the motor itself. In effect, a DC motor is provided with an odd number of poles which generate a motor current containing a fixed number of discontinuities which define a signature wave form. This allows speed information and position information to be derived from the motor current and thus allows it to be used, for example, as a replacement for a low resolution AC tachometers system A disadvantage of forming one winding with fewer turns than the other windings is that a mechanical imbalance is introduced. As can be seen in FIG. 1A, when the three windings $\Phi$ are all identical, the mechanical centre of gravity 3 of the rotor coincides with the axis of rotation of the rotor. In FIG. 1B, however, the centre of gravity 3 is moved off the axis of rotation in a direction away from the reduced turn winding $\Phi 1$-1. This mechanical imbalance inevitable introduces a number of difficulties and problems, including noise and excessive wear on the rotor bearings.

SUMMARY OF THE INVENTION

According to the present invention there is provided an electric motor comprising a plurality of coil windings, wherein one of said windings is formed with a reduced number of turns forming part of a motor circuit in comparison with the remainder of said windings, and wherein said reduced winding is provided with mechanical balance compensation means for compensating for any imbalance caused by the reduced number of windings.

By means of this arrangement the advantage of a reduced number of turns on one winding may be provided, while at the same time the disadvantage of the imbalance caused by the reduced number of windings may be compensated for.

Preferably the compensating means may comprise further turns of the wire forming the winding but which are not part of the electrical circuit, whereby they are effective from a mechanical point of view in balancing the rotor, but electrically they do not exist. For example, the further turns may comprise a wire connected at one end to the coil winding, and the other end being electrically unconnected, with possibly a mid-point of this wire being connected to one of the commutator segments to which the coil winding is connected.

Providing one of the coil windings with a different number of turns allows for much more accurate control of the motor, especially for example for applications such as high-accuracy motors, for example for applications such as the carriage drive motors for computer printers.

Viewed from another broad aspect therefore the present invention provides a control system for an electric motor, wherein said motor comprises a plurality of coil windings, wherein one of said windings is formed with a reduced number of turns forming part of a motor circuit in comparison with the remainder of said windings whereby in use the current that flows in said one winding is greater than the current that flows in the remainder, and wherein said reduced winding is provided with mechanical balance compensation means for compensating for any imbalance caused by the reduced number of windings, said control means further comprising:

(a) means for detecting the current flowing in the motor circuit and for generating a voltage in response to said current, (b) means for generating a reference voltage, (c) comparator means for comparing said motor current derived voltage with said reference voltage, said comparator means producing an output pulse when said current derived voltage exceeds said reference voltage, and (d) motor control means for controlling the voltage applied to the motor in response to said output pulses of the comparator.

The motor control system may be used to accurately know the position of the motor and the number of rotations of the motor. In addition because the system can detect the number of rotations and position of the motor, it is possible to pre-programme the motor to rotate a given number of times and into a given angular position.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT

Figure 1A:
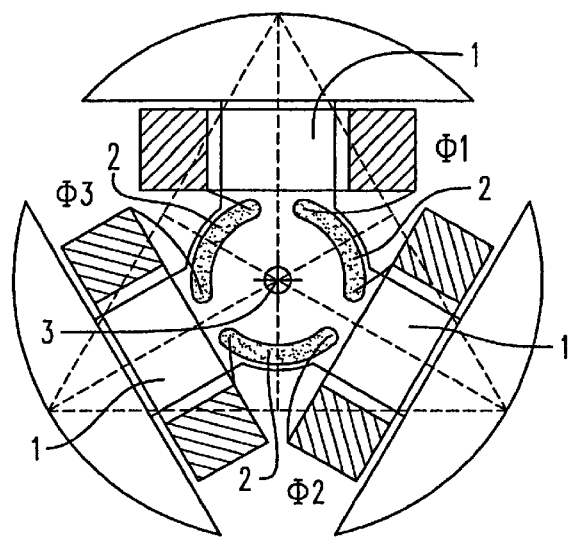
FIGS. 1A–C are sectional views through rotors of electric motors according to the prior art (FIGS. 1A and B) and according to an embodiment of the invention (FIG. 1C)
Figure 1B:
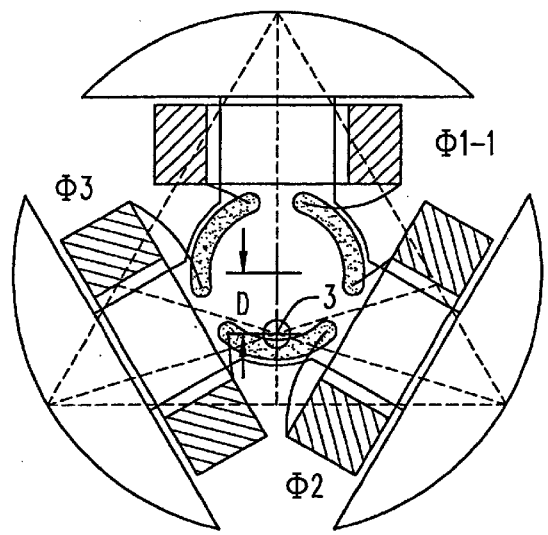
Figure 1C:
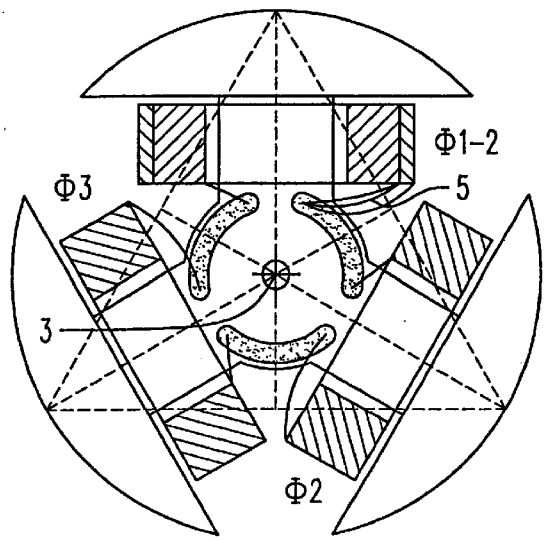
Figure 2A:
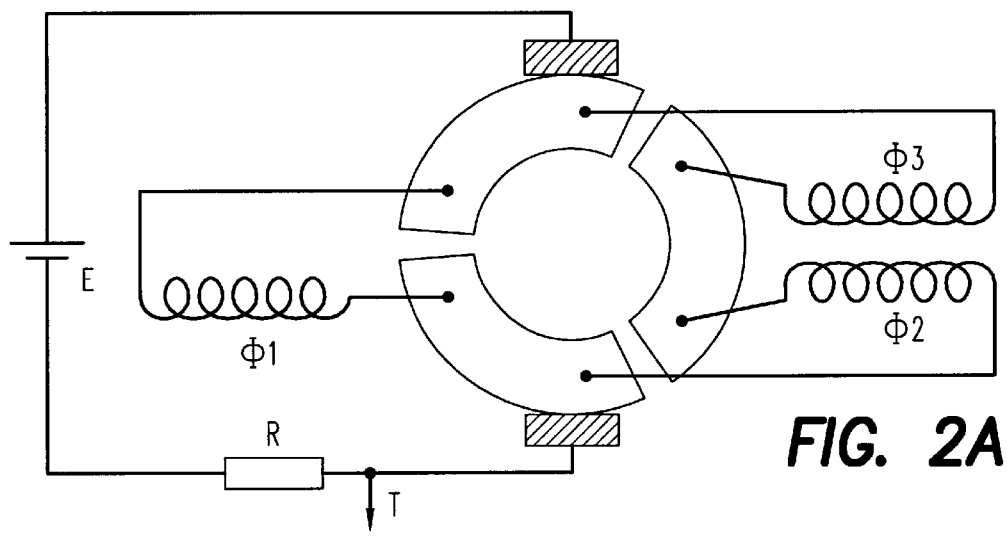
FIGS. 2A–C are schematic circuit diagrams corresponding to FIGS. 1A–C.

FIGS. 1A and 2A show a conventional electric motor. As described above the rotor of the motor comprises three equiangularly spaced poles 1 about each of which is an identical coil winding $\Phi$. Each of the coil windings are connected between pairs of commutator segments 2 and as the rotor rotates bringing different pairs of commutator segments 2 into contact with the brushes (not shown in FIGS. 1 and 2), current is caused to flow through each winding in turn, the actual current depending on the applied DC voltage, the number of turns of the winding and the back emf generated. The current can be detected by including a tap resistance R in series and by taking a tap T as will be described further below.

Figure 2B:
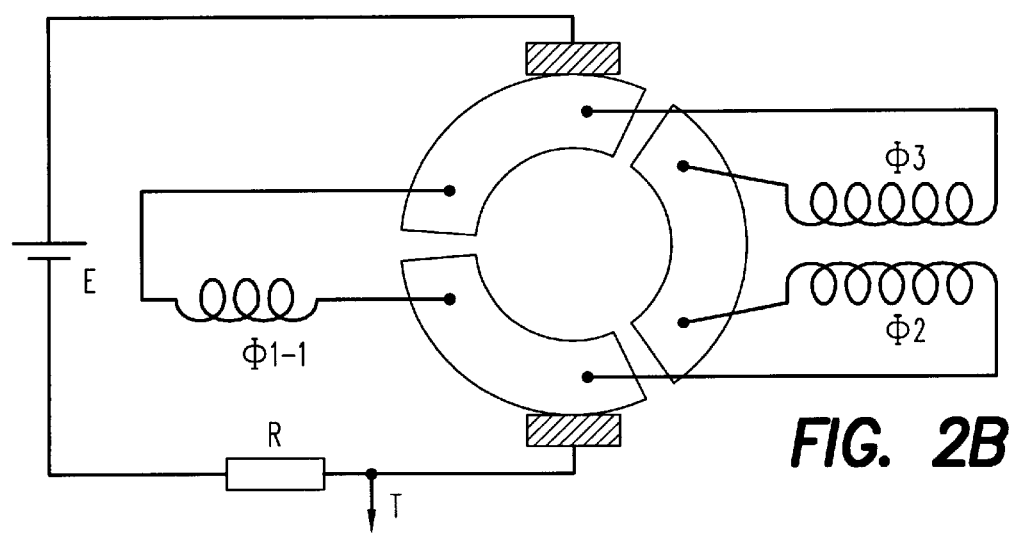

As shown in FIGS. 1B and 2B it is known to form one of the three windings $\Phi1$-1 with a reduced number of turns in comparison with the other windings $\Phi2$ and $\Phi3$. This means that the current that flows when winding $\Phi1$-1 is in the circuit is different from when either winding $\Phi2$ or winding $\Phi3$ is in the circuit. This difference can be detected and used in a number of ways as a reference, for example to keep track of the precise number of rotations of the motor rotor.

A drawback with the prior art arrangement of FIGS. 1B and 2B is that a mechanical imbalance is introduced by reducing the number of turns in one of the windings. This can be seen by comparing FIGS. 1A and 1B. In FIG. 1A since all the windings are identical, and all the rotor arms are identical, the centre of gravity 3 of the rotor falls exactly on the axis of rotation of the rotor. In contrast, in FIG. 1B because winding $\Phi1$-1 has a reduced number of turns, it is of lower weight than the other windings $\Phi2$ and $\Phi3$. This means that the centre of gravity 3 of the rotor bearing the windings is no longer on the axis of rotation but is shifted in a direction away from the winding $\Phi1$-1 along a line bisecting the arms bearing windings $\Phi2$ and $\Phi3$. This imbalance, with the centre of gravity no longer being on the axis of rotation, introduces the disadvantages identified in the introduction.

Figure 2C:
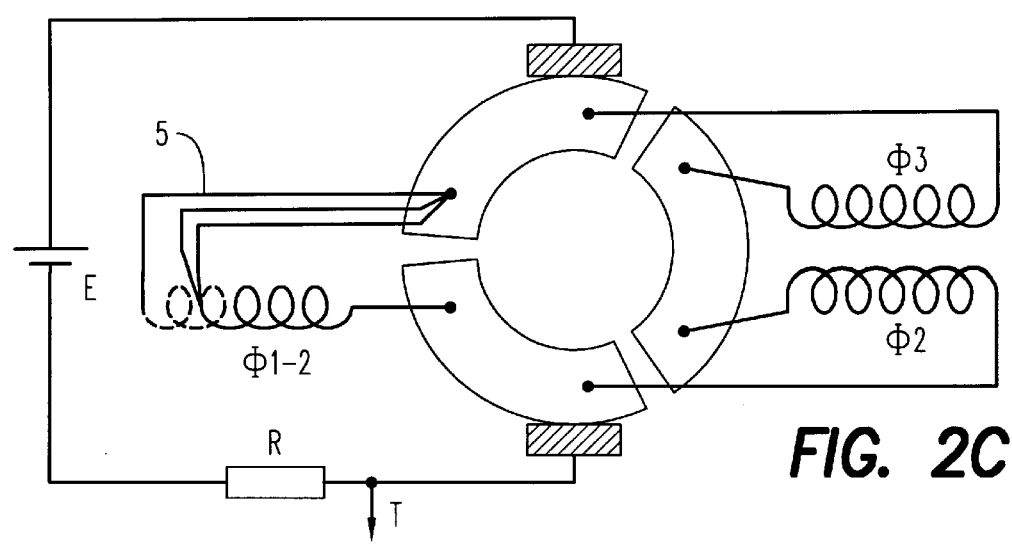

An embodiment of the present invention is shown in FIGS. 1C and 2C. In this embodiment the coil winding $\Phi1$-2 is of a reduced number of turns in comparison with the remaining coil windings $\Phi2$ and $\Phi3$ which gives a number of advantages as will be discussed below. In this embodiment of the invention, however, to avoid any mechanical imbalance the rotor arm bearing the coil winding $\Phi1$-2 is also provided with compensating means in the form of an additional winding 5 which does not form part of the electrical circuit but which serves to ensure that the weight of the windings in the rotor arm bearing coil winding $\Phi1$-2 is equal to the windings $\Phi2$ and $\Phi3$ so that the centre of gravity of the rotor remains on the rotor axis and there is no mechanical imbalance.

In the embodiment of FIGS. 1C and 2C this compensating winding 5 is formed by a wire that is connected at one end to the coil winding $\Phi1$-2 and the other end of which is electrically free. The compensating winding 5 is connected at a half-way point to one of the commutator segments to which the coil winding $\Phi1$-2 is connected. Thus the presence of the compensating winding has no electrical effect. The present invention therefore provides a motor with the advantages of one of the windings being of a different number of turns, without any mechanical imbalance.

Figure 3:
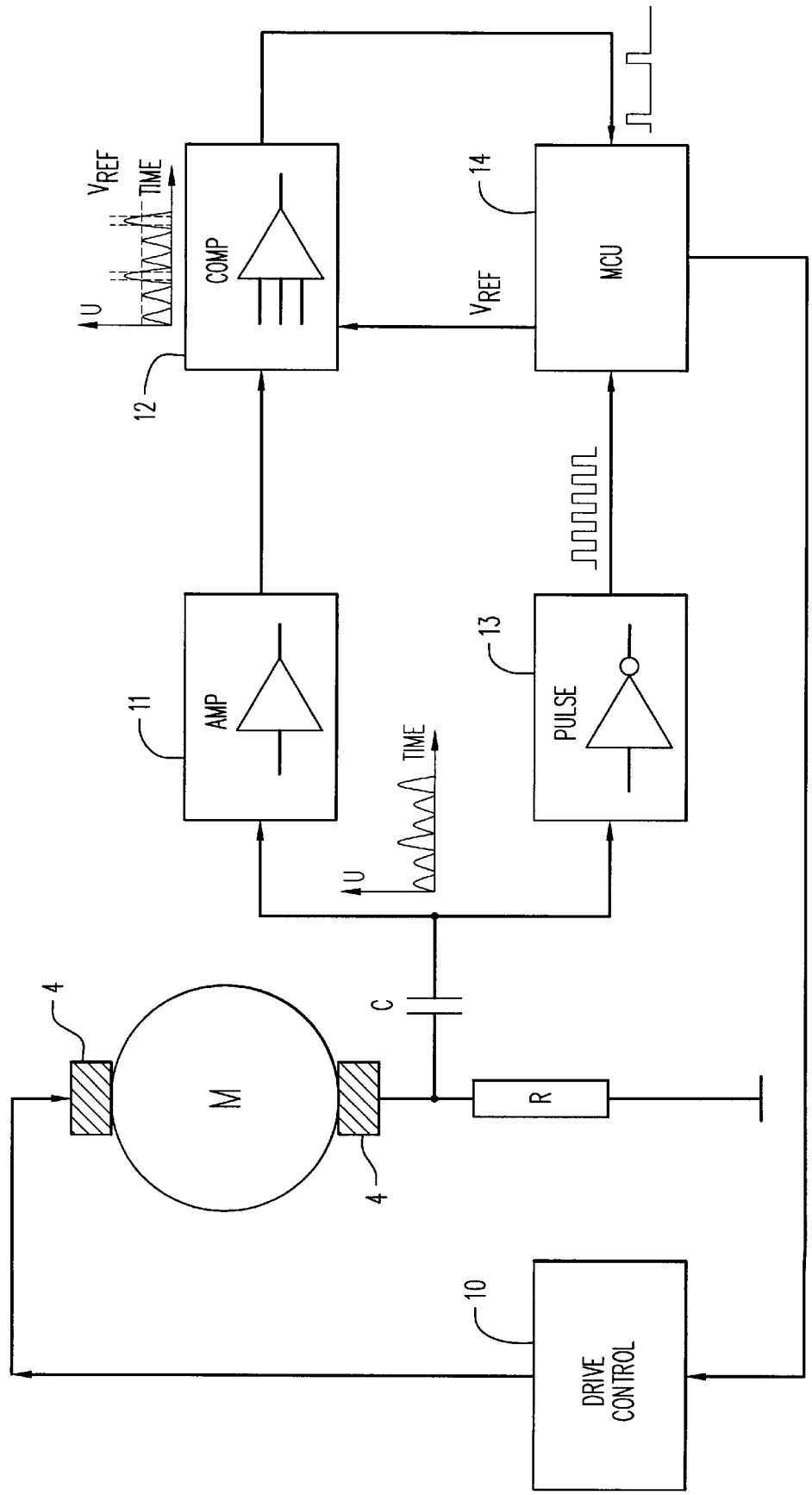
FIG. 3 is a schematic block diagram showing how a motor of the present invention may be controlled, FIGS. 4(a) and (b) show respectively the signature waveform and a possible test circuit.

FIG. 3 illustrates how a motor according to an embodiment of the present invention may be employed to provide a motor capable of accurate control. In FIG. 3 the motor is represented at M and current is fed to the motor by brushes 4. The current to the motor M is controlled by a drive control unit 10 which in turn receives an input from a control means that will be described below.

The current flowing in the windings may be detected by tapping the voltage from a tap resistance R through capacitance C. The detected voltage is then fed to an amplifier 11 and from the amplifier 11 to a comparator 12. The voltage is also used to trigger a pulse generator 13 which produces six equal square pulses per rotation of the motor. These pulses are used to generate a reference voltage $V_{REF}$. As can be seen from FIG. 3 the detected voltage comprises six pulses: four of a relatively low height corresponding to the current flowing the winding coils $\Phi2$ and $\Phi3$, the other pulses being a higher pulse and corresponding to the current flowing in winding coil $\Phi1$-2. The reference voltage $V_{REF}$ produced is set to the height of the voltage peaks from the windings $\Phi2$ and Φ3 by means of a microprocessor control unit (MCU) 14 which feeds the reference voltage to the other input of the comparator. Thus the comparator produces an output pulse every time a pulse corresponding to winding Φ1-2 is generated, ie twice per rotation of the motor rotor. The output pulse of the comparator is fed back to the MCU 14 where it may be used in a number of ways, including in the drive control of the motor.

Thus in this way it is possible to control finely the number of rotations of the motor, and this has numerous applications for high-accuracy applications such as stepper motors. Since two pulses are generated per rotation of the motor, the number of rotations can be accurately counted. Furthermore the pulse corresponds to a known angular position of the motor rotor (the position in which winding Φ1-2 is in the electrical circuit) which allows the position of the motor to be accurately determined. This information can be used in a number of ways. Notably, not only can the number of rotations and position of the motor be accurately determined, but conversely the motor can be programmed in advance to turn for a number of cycles or fractions of cycles by the MCU 14.

Figure 4A:
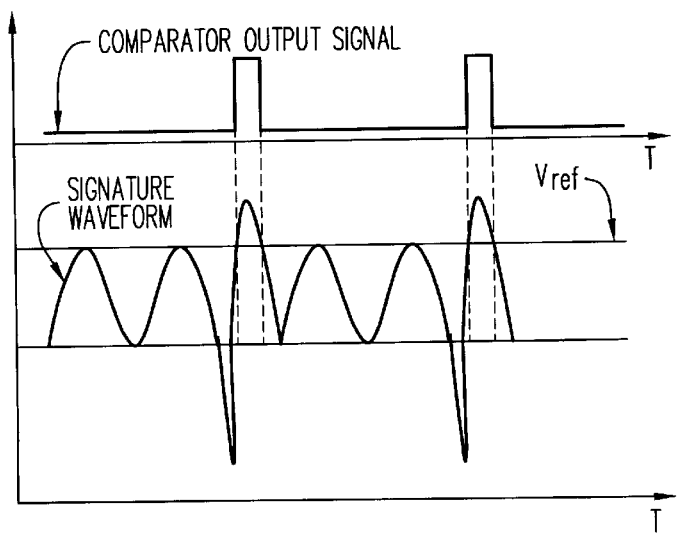
Figure 4B:
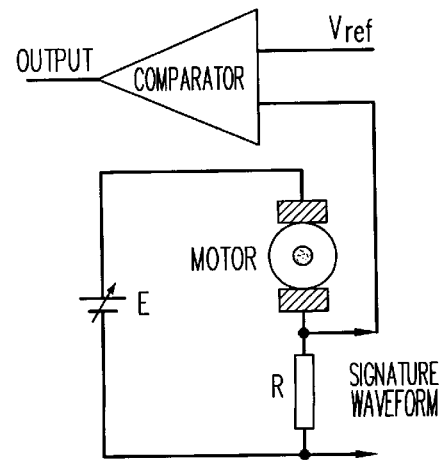

In FIG. 4(a) an alternate simpler control circuit is shown. In this embodiment the voltage output across resistance R is fed directly to a comparator where it is one input along with reference voltage $V_{REF}$. $V_{REF}$ is set to approximately the value of the peaks of the voltage output corresponding to the coils with the normal number of windings, and the comparator produced an output when the coil with reduced windings is in the circuit and the voltage thus exceeds the reference voltage. Thus the comparator produces an output signal twice every rotation of the motor and this can be used for speed and position control of the motor in a feedback control.

Figure 5:
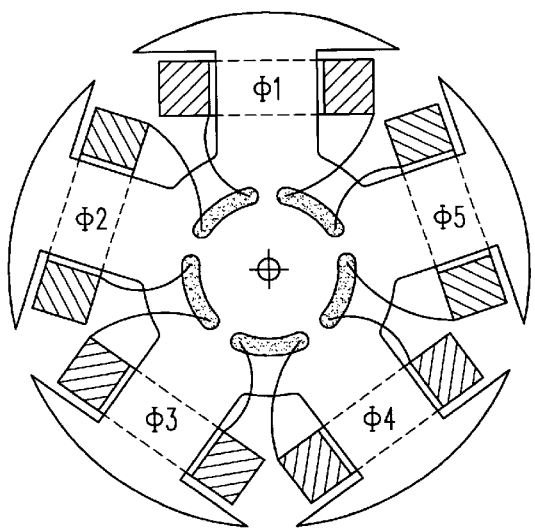
FIG. 5 shows a possible embodiment with five poles.

In the embodiment described above the motor has three poles, however it will be understood that this is by no means essential and the motor may have any odd number of poles. FIG. 5, for example, shows a possible embodiment with five poles. Any one or more of these poles could be provided with a reduced number of turns compared to a regular coil winding.

In the embodiment described above the mechanical compensation means comprises an additional non-electrically functioning winding, but it will be understood that other compensation means may be provided, such as weights or additional laminates provided on the motor arm. The provision of an additional wire winding, however, is simpler form the point of view of manufacturing. It will also be understood that while the above embodiment is of a motor having three coil windings, the invention is not limited thereto and may be applied to a motor having any number of windings provided that it is greater than one.

I claim:

1. An electric motor comprising a plurality of coil windings, wherein one of said windings is formed with a reduced number of turns forming part of a motor circuit in comparison with the remainder of said windings, and wherein said reduced winding is provided with a further winding not forming part of the electrical circuit for compensating for any mechanical imbalance caused by the reduced number of windings.

2. A motor as claimed in claim 1 wherein said further winding comprises a wire connected at one end to the coil winding and the other end being electrically unconnected.

3. A motor as claimed in claim 2 wherein a mid-portion of the wire is connected to a commutator segment to which said coil winding is connected.

4. A motor as claimed in claim 1 wherein said motor comprises three coil windings.

5. A motor as claimed in claim 1 wherein said motor comprises five coil windings.

6. A control system for an electric motor, wherein said motor comprises a plurality of coil windings, wherein one of said windings is formed with a reduced number of turns forming part of a motor circuit in comparison with the remainder of said windings whereby in use the current that flows in said one winding is greater than the current that flows in the remainder, and wherein said reduced winding is provided with a further winding not forming part of the electrical circuit for compensating for any mechanical imbalance caused by the reduced number of windings, said control means further comprising:

(a) means for detecting the current flowing in the motor circuit and for generating a voltage in response to said current, (b) means for generating a reference voltage, (c) comparator means for comparing said motor current derived voltage with said reference voltage, said comparator means producing an output pulse when said current derived voltage exceeds said reference voltage, and (d) motor control means for controlling the voltage applied to the motor in response to said output pulses of the comparator.

\* \* \* \* \*